United States Patent [19]

Wang

[11] Patent Number: 5,509,103
[45] Date of Patent: Apr. 16, 1996

[54] METHOD OF TRAINING NEURAL NETWORKS USED FOR SPEECH RECOGNITION

[75] Inventor: Shay-Ping T. Wang, Long Grove, Ill.

[73] Assignee: Motorola, Inc., Schaumberg, Ill.

[21] Appl. No.: 253,893

[22] Filed: Jun. 3, 1994

[51] Int. Cl.$^6$ ........................................... G10L 9/00
[52] U.S. Cl. ............................... 395/2.41; 395/23
[58] Field of Search .......................... 395/23, 24, 25, 395/2.41

[56] References Cited

U.S. PATENT DOCUMENTS

| | | | |
|---|---|---|---|
| 5,365,592 | 11/1994 | Horner et al. | 381/46 |
| 5,404,422 | 4/1995 | Sakamoto et al. | 395/2.41 |
| 5,408,586 | 4/1995 | Skeirik | 395/23 |
| 5,408,588 | 4/1995 | Ulug | 395/23 |

OTHER PUBLICATIONS

R. G. Gallager, *Information Theory and Reliable Communication*, Wiley, New York, 1968, pp. 286–290.

*Primary Examiner*—Allen R. MacDonald
*Assistant Examiner*—Thomas J. Onka
*Attorney, Agent, or Firm*—Bruce E. Stuckman; Walter W. Nielsen; Michael D. Bingham

[57] ABSTRACT

A speech-recognition system for recognizing isolated words includes pre-processing circuitry for performing analog-to-digital conversion and cepstral analysis, and a plurality of neural networks which compute discriminant functions based on polynomial expansions. The system may be implemented using either hardware or software or a combination thereof. The speech wave-form of a spoken word is analyzed and converted into a sequence of data frames. The sequence of frames is partitioned into data blocks, and the data blocks are then broadcast to a plurality of neural networks. Using the data blocks, the neural networks compute polynomial expansions. The output of the neural networks is used to determine the identity of the spoken word. The neural networks utilize a matrix-inversion or alternatively a least-squares estimation training algorithm which does not require repetitive training and which yields a global minimum to each given set of training examples.

21 Claims, 4 Drawing Sheets

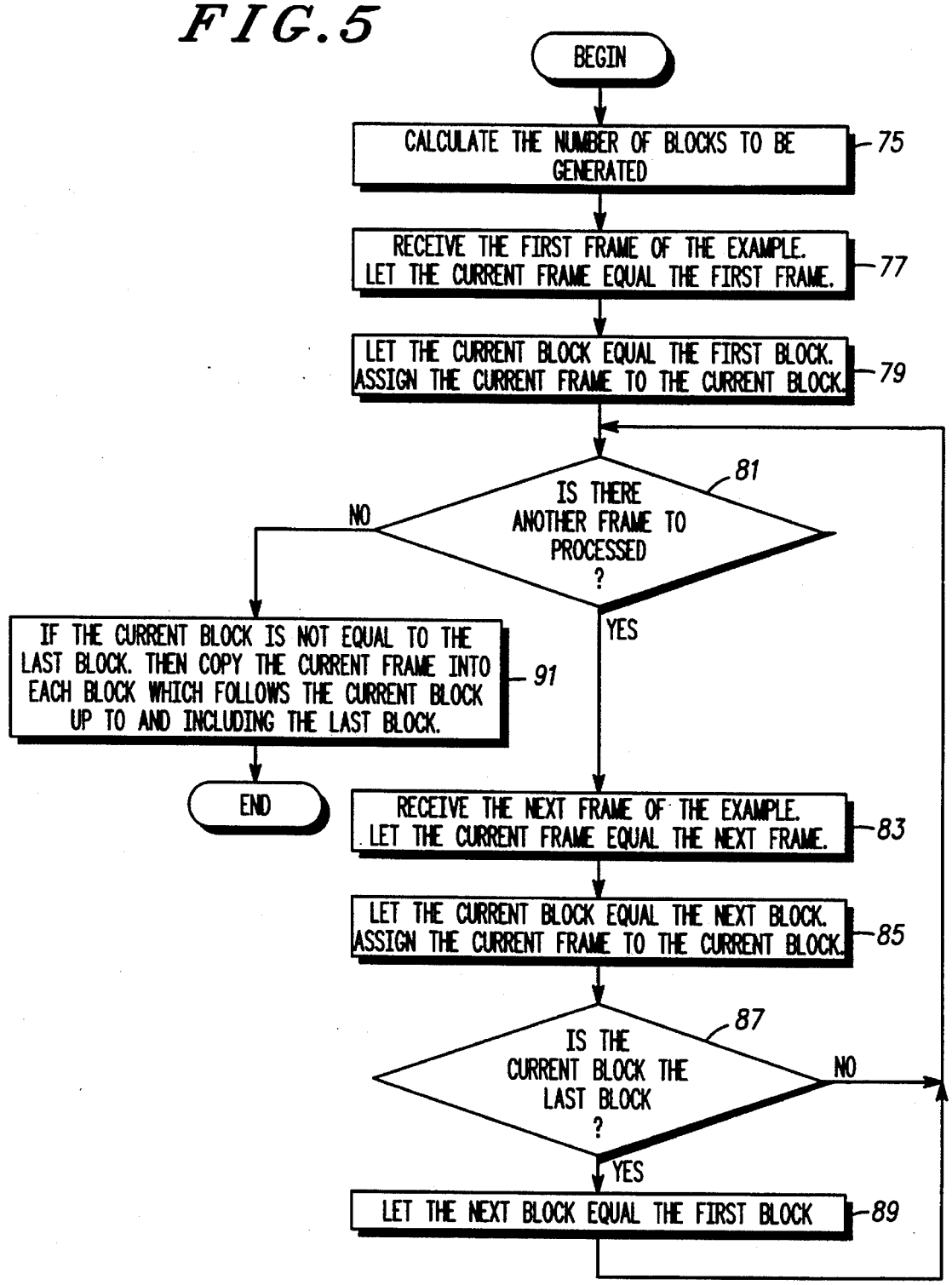

METHOD OF TRAINING NEURAL NETWORKS USED FOR SPEECH RECOGNITION

RELATED INVENTIONS

The present invention is related to the following inventions which are assigned to the same assignee as the present invention:

(1) "Neural Network and Method of Using Same", having Ser. No. 08/076,601, filed Jun. 14, 1993;

(2) "Neural Network Utilizing Logarithmic Function and Method of Using Same", having Ser. No. 08/176,601, filed Jan. 3, 1994;

(3) "Speech-Recognition System Utilizing Neural Networks and Method of Using Same", having Ser. No. 08/254,844, filed on even date herewith; and (4) "Method of Partitioning a Sequence of Data Frames", having Ser. No. 08/254,847, filed on even date herewith.

The subject hatter of the above-identified related inventions is hereby incorporated by reference into the disclosure of this invention.

1. Technical Field

This invention relates generally to speech-recognition devices, and, in particular, to a method of training neural networks used in a speech-recognition system which is capable of speaker-independent, isolated word recognition.

2. Background of the Invention

For many years, scientists have been trying to find a means to simplify the interface between man and machine. Input devices such as the keyboard, mouse, touch screen, and pen are currently the most commonly used tools for implementing a man/machine interface. However, a simpler and more natural interface between man and machine may be human speech. A device which automatically recognizes speech would provide such an interface.

Potential applications for an automated speech-recognition device include a database query technique using voice commands, voice input for quality control in a manufacturing process, a voice-dial cellular phone which would allow a driver to focus on the road while dialing, and a voice-operated prosthetic device for the physically disabled.

Unfortunately, automated speech recognition is not a trivial task. One reason is that speech tends to vary considerably from one person to another. For instance, the same word uttered by several persons may sound significantly different due to differences in accent, speaking speed, gender, or age. In addition to speaker variability, co-articulation effects, speaking modes (shout/whisper), and background noise present enormous problems to speech-recognition devices.

Since the late 1960's, various methodologies have been introduced for automated speech recognition. While some methods are based on extended knowledge with corresponding heuristic strategies, others rely on speech databases and learning methodologies. The latter methods include dynamic time-warping (DTW) and hidden-Markov modeling (HMM). Both of these methods, as well as the use of time-delay neural networks (TDNN), are discussed below.

Dynamic time-warping is a technique which uses an optimization principle to minimize the errors between an unknown spoken word and a stored template of a known word. Reported data shows that the DTW technique is very robust and produces good recognition. However, the DTW technique is computationally intensive. Therefore, it is impractical to implement the DTW technique for real-world applications.

Instead of directly comparing an unknown spoken word to a template of a known word, the hidden-Markov modeling technique uses stochastic models for known words and compares the probability that the unknown word was generated by each model. When an unknown word is uttered, the HMM technique will check the sequence (or state) of the word, and find the model that provides the best match. The HMM technique has been successfully used in many commercial applications; however, the technique has many drawbacks. These drawbacks include an inability to differentiate acoustically similar words, a susceptibility to noise, and computational intensiveness.

Recently, neural networks have been used for problems that are highly unstructured and otherwise intractable, such as speech recognition. A time-delay neural network is a type of neural network which addresses the temporal effects of speech by adopting limited neuron connections. For limited word recognition, a TDNN shows slightly better result than the HMM method. However, a TDNN suffers from some serious drawbacks.

First, the training time for a TDNN is very lengthy, on the order of several weeks. Second, the training algorithm for a TDNN often converges to a local minimum, which is not the optimum solution. The optimum solution would be a global minimum.

In summary, the drawbacks of existing known methods of automated speech-recognition (e.g. algorithms requiring impractical amounts of computation, limited tolerance to speaker variability and background noise, excessive training time, etc.) severely limit the acceptance and proliferation of speech-recognition devices in many potential areas of utility.

There is thus a significant need for an automated speech-recognition system which provides a high level of accuracy, is immune to background noise, does not require repetitive training or complex computations, produces a global minimum, and is insensitive to differences in speakers.

SUMMARY OF INVENTION

It is therefore an advantage of the present invention to provide a method of training neural networks used in a speech-recognition system which is insensitive to differences in speakers or to background noise.

It is a further advantage of the present invention to provide a method of training a speech-recognition device which does not require repetitive iterations of training epochs.

It is also an advantage of the present invention to provide a method of training a speech-recognition device which yields a global minimum to each given set of training vectors.

These and other advantages are achieved in accordance with a preferred embodiment of the invention by providing a method of training a plurality of neural networks used in a speech-recognition system, each of the neural networks comprising a plurality of neurons, the method producing a plurality of training examples wherein each of the training examples comprises an input portion and an output portion, the method comprising the following steps: (a) receiving an example spoken word; (b) performing analog-to-digital conversion of the spoken word, the conversion producing a digitized word; (c) performing cepstral analysis of the digitized word, the analysis producing a sequence of data frames; (d) generating a plurality of data blocks from the sequence of data frames; (e) selecting one of the plurality of data blocks and equating the input portion of one of the plurality of training examples to the selected data block; (f) selecting one of the plurality of neural networks and determining if the selected neural network is to recognize the selected data block; if so, setting the output portion of the one training example to one; if not, setting the output portion of the one training example to zero; (g) saving the one training example; (h) determining if there is another one of the plurality of data blocks; if so, returning to step (e); if not, ending the method.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 5 shows a flow diagram of a method of executing a divide-and-conquer algorithm of the present invention.

DETAILED DESCRIPTION OF A PREFERRED EMBODIMENT

Figure 1:
FIG. 1 shows a contextual block diagram of a speech-recognition system.

FIG. 1 shows a contextual block diagram of a speech-recognition system. The system comprises a microphone 1 or equivalent means for receiving audio input in the form of speech input and converting sound into electrical energy, pre-processing circuitry 3 which receives electrical signals from microphone 1 and performs various tasks such as wave-form sampling, analog-to-digital (A/D) conversion, cepstral analysis, etc., and a computer 5 which executes a program for recognizing speech and accordingly generates an output identifying the recognized speech.

The operation of the system commences when a user speaks into microphone 1. In a preferred embodiment, the system depicted by FIG. 1 is used for isolated word recognition. Isolated word recognition takes place when a person speaking into the microphone makes a distinct pause between each word.

When a speaker utters a word, microphone 1 generates a signal which represents the acoustic wave-form of the word. This signal is then fed to pre-processing circuitry 3 for digitization by means of an A/D converter (not shown). The digitized signal is then subjected to cepstral analysis, a method of feature extraction, which is also performed by pre-processing circuitry 3. Computer 5 receives the results of the cepstral analysis and uses these results to determine the identity of the spoken word.

The following is a more detailed description of the pre-processing circuitry 3 and computer 5. Pre-processing circuitry 3 may include a combination of hardware and software components in order to perform its tasks. For example, the A/D conversion may be performed by a specialized integrated circuit, while the cepstral analysis may be performed by software which is executed on a microprocessor.

Pre-processing circuitry 3 includes appropriate means for A/D conversion. Typically, the signal from microphone 1 is an analog signal. An A/D converter (not shown) samples the signal from microphone 1 several thousand times per second (e.g. between 8,000 and 14,000 times per second in a preferred embodiment). Each of the samples is then converted to a digital word, wherein the length of the word is between 12 and 32 bits. The digitized signal comprises one or more of these digital words. Those of ordinary skill in the art will understand that the sampling rate and word length of A/D converters may vary and that the numbers given above do not place any limitations on the sampling rate or word length of the A/D converter which is included in the present invention.

The cepstral analysis, or feature extraction, which is performed on the digitized signal, results in a representation of the signal which characterizes the relevant features of the spoken speech. It can be regarded as a data reduction procedure that retains vital characteristics of the speech and eliminates undesirable interference from irrelevant characteristics of the digitized signal, thus easing the decision-making process of computer 5.

The cepstral analysis is performed as follows. First, the digitized samples, which make up the digitized signal, are divided into a sequence of sets. Each set includes samples taken during an interval of time which is of fixed duration. To illustrate, in a preferred embodiment of the present invention the interval of time is 15 milliseconds. If the duration of a spoken word is, for example, 150 milliseconds, then circuitry 3 will produce a sequence of ten sets of digitized samples.

Next, a p-th order (typically p=12 to 14) linear prediction analysis is applied on each set of samples to yield p prediction coefficients. The prediction coefficients are then converted into cepstrum coefficients using the following recursion formula:

$$c(n) = a(n) + \sum_{k=1}^{n-1} (1 - k/n)a(k)c(n-k) \qquad \text{Equation (1)}$$

wherein $c(n)$ represents the vector of cepstrum coefficients, $a(n)$ represents the prediction coefficients, $1 \leq n \leq p$, p is equal to the number of cepstrum coefficients, n represents an integer index, and k represents integer index. $a(k)$ represents the $k^{th}$ prediction coefficient and $c(n-k)$ represents the $(n-k)^{th}$ cepstrum coefficient.

The vector of cepstrum coefficients is usually weighted by a sine window of the form, $$\alpha(n) = 1 + (L/2) \sin(\pi n/L) \qquad \text{Equation (2)}$$

wherein $1 \leq n \leq p$, and L is an integer constant, giving the weighted cepstrum vector, C(n), wherein $$C(n) = c(n)\, \alpha(n) \qquad \text{Equation (3)}$$

This weighting is commonly referred to as cepstrum liftering. The effect of this liftering process is to smooth the spectral peaks in the spectrum of the speech sample. It has also been found that cepstrum liftering suppresses the existing variations in the high and low cepstrum coefficients, and thus considerably improves the performance of the speech-recognition system.

Thus, the result of the cepstral analysis is a sequence of smoothed log spectra wherein each spectrum corresponds to a discrete time interval from the period during which the word was spoken.

The significant features of the speech signal are thus preserved in the spectra. For each spectrum, pre-processing circuitry 3 generates a respective data frame which comprises data points from the spectrum. The generation of a data frame per spectrum results in a time-ordered sequence of data frames. This sequence is passed to computer 5.

In a preferred embodiment, each data frame contains twelve data points, wherein each of the data points represents the value of cepstrally-smoothed spectrum at a specific frequency. The data points are 32-bit digital words. Those skilled in the art will understand that the present invention places no limits on the number of data points per frame or the bit length of the data points; the number of data points contained in a data frame may be twelve or any other appropriate value, while the data point bit length may be 32 bits, 16 bits, or any other value.

The essential function of computer 5 is to determine the identity of the word which was spoken. In a preferred embodiment of the present invention, computer 5 may include a partitioning program for manipulating the sequence of data frames, a plurality of neural networks for computing polynomial expansions, and a selector which uses the outputs of the neural networks to classify the spoken word as a known word. Further details of the operation of computer 5 are given below.

Figure 2:
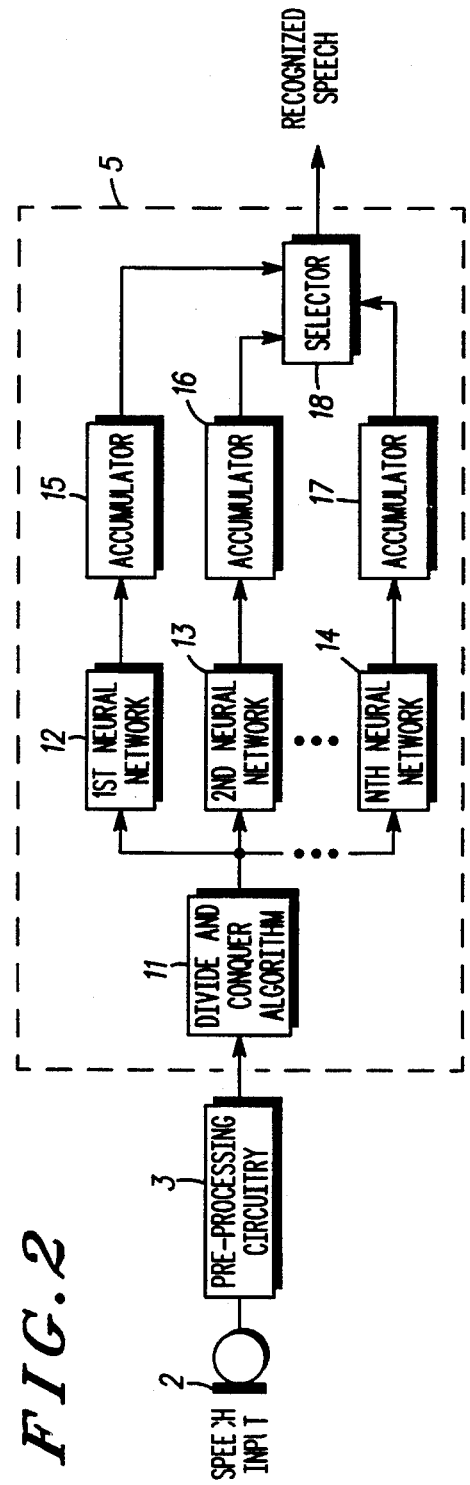
FIG. 2 shows a conceptual diagram of a speech-recognition system which utilizes the present invention.

FIG. 2 shows a conceptual diagram of a speech-recognition system which utilizes the present invention.

In a preferred embodiment, the speech-recognition system recognizes isolated spoken words. A microphone 1 receives speech input from a person who is speaking, and converts the input into electrical signals. The electrical signals are fed to pre-processing circuitry 3.

Pre-processing circuitry 3 performs the functions described above regarding FIG. 1. Circuitry 3 performs A/D conversion and cepstral analysis, and circuitry 3 may include a combination of hardware and software components in order to perform its tasks. The output of pre-processing circuitry 3 takes the form of a sequence of data frames which represent the spoken word. Each data frame comprises a set of data points (32-bit words) which correspond to a discrete time interval from the period during which the word was spoken. The output of circuitry 3 is transmitted to computer 5.

Computer 5 may be a general-purpose digital computer or a specific-purpose computer. Computer 5 comprises suitable hardware and/or software for performing a divide-and-conquer algorithm 11. Computer 5 further comprises a plurality of neural networks represented by 1st Neural Network 12, 2nd Neural Network 13, and Nth Neural Network 14. The output of each neural network 12, 13, and 14 is fed into a respective accumulator 15, 16, and 17. The outputs of accumulators 15–17 are fed into a selector 18, whose output represents the recognized speech word.

Divide-and-conquer algorithm 11 receives the sequence of data frames from pre-processing circuitry 3, and from the sequence of data frames it generates a plurality of data blocks. In essence, algorithm 11 partitions the sequence of data frames into a set of data blocks, each of which comprises a subset of data frames from the input sequence. The details of the operation of divide-and-conquer algorithm 11 are given below in the section entitled "Divide-and-Conquer Algorithm". In a preferred embodiment, each of four data blocks includes five data frames from the input sequence.

The first data block comprises the first data frame and every fourth data frame thereafter appearing in the sequence of data frames. The second data block comprises the second data frame and every fourth data frame thereafter in the sequence. And so on, successive data frames being allocated to each of the four data blocks, in turn, until each data block contains the same number of data frames. If the number of data frames turns out to be insufficient to provide each block with an identical number of data frames, then the last data frame in the sequence is copied into the remaining data blocks, so that each contains the same number of data frames.

A means for distributing the data blocks is used to transfer the data blocks from algorithm 11 to the inputs of neural networks 12, 13, and 14. In turn, each data block is transferred simultaneously to neural networks 12, 13, and 14. While FIG. 2 shows only three neural networks in the speech-recognition system, it will be understood by one of ordinary skill that any number of neural network may be used if a particular application requires more or less than three neural networks.

It will be apparent to one of ordinary skill that each neural network comprises a plurality of neurons.

In a preferred embodiment of the present invention, each of the neural networks may have been previously trained to recognize a specific set of speech phonemes. Generally, a spoken word comprises one or more speech phonemes.

Neural networks 12, 13, and 14 act as classifiers that determine which word was spoken, based on the data blocks. In general, a classifier makes a decision as to which class an input pattern belongs. In a preferred embodiment of the present invention, each class is labeled with a known word, and data blocks are obtained from a predefined set of spoken words (the training set) and used to determine boundaries between the classes, boundaries which maximize the recognition performance for each class.

In a preferred embodiment, a parametric decision method is used to determine whether a spoken word belongs to a certain class. With this method, each neural network computes a different discriminant function $y_j(X)$, wherein $X=\{x_1, x_2, \ldots, x_i\}$ is the set of data points contained in a data block, i is an integer index, and j is an integer index corresponding to the neural network. Upon receiving a data block, the neural networks compute their respective discriminant functions. If the discriminant function computed by a particular neural network is greater than the discriminant function of each of the other networks, then the data block belongs to the particular class corresponding to the neural network.

In other words, each neural network defines a different class; thus, each neural network recognizes a different word. For example, neural network 12 may be trained to recognize the word "one", neural network 13 may be trained to recognize the word "two", and so forth. The method of training the neural networks is described below in the section entitled "Neural Network Training".

The discriminant functions computed by the neural networks of the present invention are based upon the use of a polynomial expansion and, in a loose sense, the use of an orthogonal function, such as a sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment employs a polynomial expansion of which the general case is represented by Equation 4 as follows:

$$y = \sum_{i=1}^{\infty} w_{i-1} x_1^{g_{1i}} x_2^{g_{2i}} \ldots x_n^{g_{ni}} \qquad \text{Equation (4)}$$

wherein $x_i$ represents the neural network inputs and can be a function such as $x_i=f_i(z_j)$, wherein $z_j$ is any arbitrary variable, and wherein the indices i and j may be any positive integers; wherein y represents the output of the neural network; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of neural network inputs.

Each term of Equation 4 expresses a neuron output and the weight and gating functions associated with such neuron. The number of terms of the polynomial expansion to be used in a neural network is based upon a number of factors, including the number of available neurons, the number of training examples, etc. It should be understood that the higher order terms of the polynomial expansion usually have less significance than the lower order terms. Therefore, in a preferred embodiment, the lower order terms are chosen whenever possible, based upon the various factors mentioned above. Also, because the unit of measurement associated with the various inputs may vary, the inputs may need to be normalized before they are used.

Equation 5 is an alternative representation of Equation 4, showing terms up to the third order terms.

$$\begin{aligned}
y = & \; w_0 + \sum_{i=1}^{n} w_i x_i + \sum_{i=1}^{n} w_{f1(i)} x_i^2 + \\
& \sum_{i=1}^{n} \sum_{j=i+1}^{n} w_{f2(i,j)} x_i x_j + \sum_{i=1}^{n} w_{f3(i)} x_i^3 \\
& + \sum_{i=1}^{n} \sum_{j=i+1}^{n} w_{f4(i,j)} x_i^2 x_j \\
& + \sum_{i=1}^{n} \sum_{j=i+1}^{n} w_{f5(i,j)} x_i x_j^2 \\
& + \sum_{i=1}^{n} \sum_{j=i+1}^{n} \sum_{k=i+j+1}^{n} w_{f6(i,j,k)} x_i x_j x_k \\
& + \ldots
\end{aligned} \qquad \text{Equation (5)}$$

wherein the variables have the same meaning as in Equation 4 and wherein f1(i) is an index function in the range of n+1 to 2n; f2(i,j) is an index function in the range of 2n+1 to 2n+(n)(n−1)/2; and f3(i) is in the range of 2n+1+(n)(n−1)/2 to 3n+ (n)(n−1)/2. And f4 through f6 are represented in a similar fashion.

Those skilled in the art will recognize that the gating functions are embedded in the terms expressed by Equation 5.

Alternatively, Equation 5 can be represented as follows:

$$\begin{aligned}
y = & \; w_0 + w_1 x_1 + w_2 x_2 + \ldots w_i x_i + \ldots + w_n x_n + \\
& w_{n+1} x_1^2 + \ldots + w_{2n} x_n^2 + w_{2n+1} x_1 x_2 + \\
& w_{2n+2} x_1 x_3 + \ldots + w_{3n-1} x_1 x_n + w_{3n} x_2 x_3 + \\
& w_{3n+1} x_2 x_4 + \ldots w_{2n+(n)(n-1)/2} x_{n-1} x_n + \ldots + \\
& w_{N-1} x_1^{g_{1N}} x_2^{g_{2N}} \ldots x_n^{g_{nN}} + \ldots
\end{aligned} \qquad \text{Equation (6)}$$

wherein the variables have the same meaning as in Equation 4.

It should be noted that although the gating function terms $g_{in}$ explicitly appear only in the last shown term of Equation 6, it will be understood that each of the other terms has its $g_{in}$ term explicitly shown (e.g. for the $w_1 x_1$ term $g_{12}=1$ and the other $g_{i2}=0$, i=2,3, . . . ,n). N is any positive integer and represents the Nth neuron in the network.

In the present invention, a neural network will generate an output for every data block it receives. Since a spoken word may be represented by a sequence of data blocks, each neural network may generate a sequence of outputs. To enhance the classification performance of the speech-recognition system, each sequence of outputs is summed by an accumulator.

Thus an accumulator is attached to the output of each neural network. As described above regarding FIG. 2, accumulator 15 is responsive to output from neural network 12, accumulator 16 is responsive to output from neural network 13, and accumulator 17 is responsive to output from neural network 14. The function of an accumulator is to sum the sequence of outputs from a neural network. This creates a sum which corresponds to the neural network, and thus the sum corresponds to a class which is labeled by a known word. Accumulator 15 adds each successive output from neural network 12 to an accumulated sum, and accumulators 16 and 17 perform the same function for neural networks 13 and 14, respectively. Each accumulator presents its sum as an output.

The selector 18 uses the outputs of the accumulators to label the spoken word as a known word.

Selector 18 receives the sums from the accumulators either sequentially or concurrently. In the former case, selector 18 receives the sums in turn from each of the accumulators, for example, receiving the sum from accumulator 15 first, the sum from accumulator 16 second, and so on; or, in the latter case, selector 18 receives the sums from accumulators 15, 16, and 17 concurrently. After receiving the sums, selector 18 then determines which sum is largest and assigns the corresponding known word label, i.e. the recognized speech word, to the output of the speech-recognition system.

Figure 4:
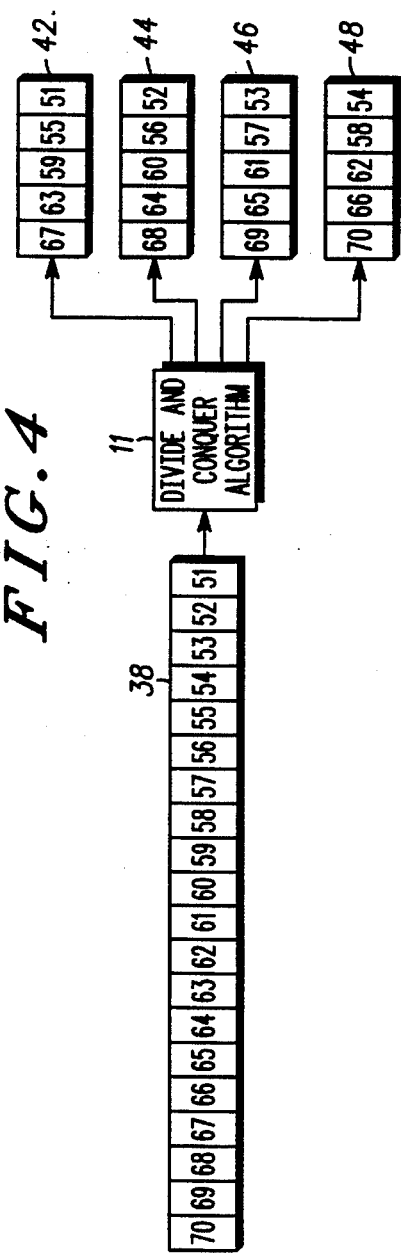
FIG. 4 illustrates data inputs and outputs of a divide-and-conquer algorithm of the present invention.

Referring now to FIG. 4 of above-identified Related Invention No. 1, which is incorporated by reference, a conceptual diagram of a neural network is shown that can be utilized by an embodiment of the present invention. A plurality of network inputs $x_1, x_2, \ldots, x_n$ are fed to input nodes 51, 52, . . . , 54 of the input layer. The output of each input node 51, 52, . . . , 54 in the input layer is distributed to each neuron of the hidden layer (of which only neurons 55, 56, and 58 are shown). For example, the output of input node 51 is coupled to each of neurons 55, 56, and 58 and to all other neurons (not shown) in the hidden layer. The same connections are made regarding the outputs of input nodes 52, 54, and all other input nodes (not shown) in the input layer. In the example shown, only one layer of neurons is required in the hidden layer.

Each neuron applies a gating function to each of the network inputs to produce corresponding gated inputs. Any given neuron may apply a different gating function to each different network input it receives. For example, neuron 55 applies a gating function $g_{11}$ to the network input it receives from input node 51; it applies a gating function $g_{21}$ to the network input it receives from input node 52; and so forth.

The gated inputs are multiplied together by the multiplier of the neuron to form a product, which is then multiplied by a predetermined weight value to produce the neuron output. For example, in FIG. 4 of Related Invention No. 1 neuron 55, which happens to be responsible for generating the $w_0$ term of Equation 4 shown herein, multiplies its gated inputs together to form a product (which happens to be 1 because in this case the gating functions $g_{11}, g_{21}, \ldots, g_{n1}$ are all 0), which is multiplied by a weight $w_0$ to produce a corresponding output $w_0$. Neuron 56 which happens to be responsible for generating the $w_1 x_1$ term of Equation 4 shown herein, multiplies its gated inputs together to form a product (which happens to be $x_1$ because in this case the gating functions are all 0 except the gating function that is applied to the $x_1$ output of input node 51), which is multiplied by a weight $w_1$ to produce a corresponding output $x_1 w_1$. In like fashion, neuron 58 produces an output $W_{N-1} x_1^{g1N} x_2^{g2N} \ldots x_n^{gnN}$.

The outputs of neurons 55, 56, . . . , 58 are summed together by a suitable summing means or function, such as summer 60, in the output layer to produce the output y of the neural network.

Further disclosure regarding alternative versions of neural networks that can be used by an embodiment of the present invention are found in above-identified Related Inventions Nos. 1 and 2.

Figure 3:
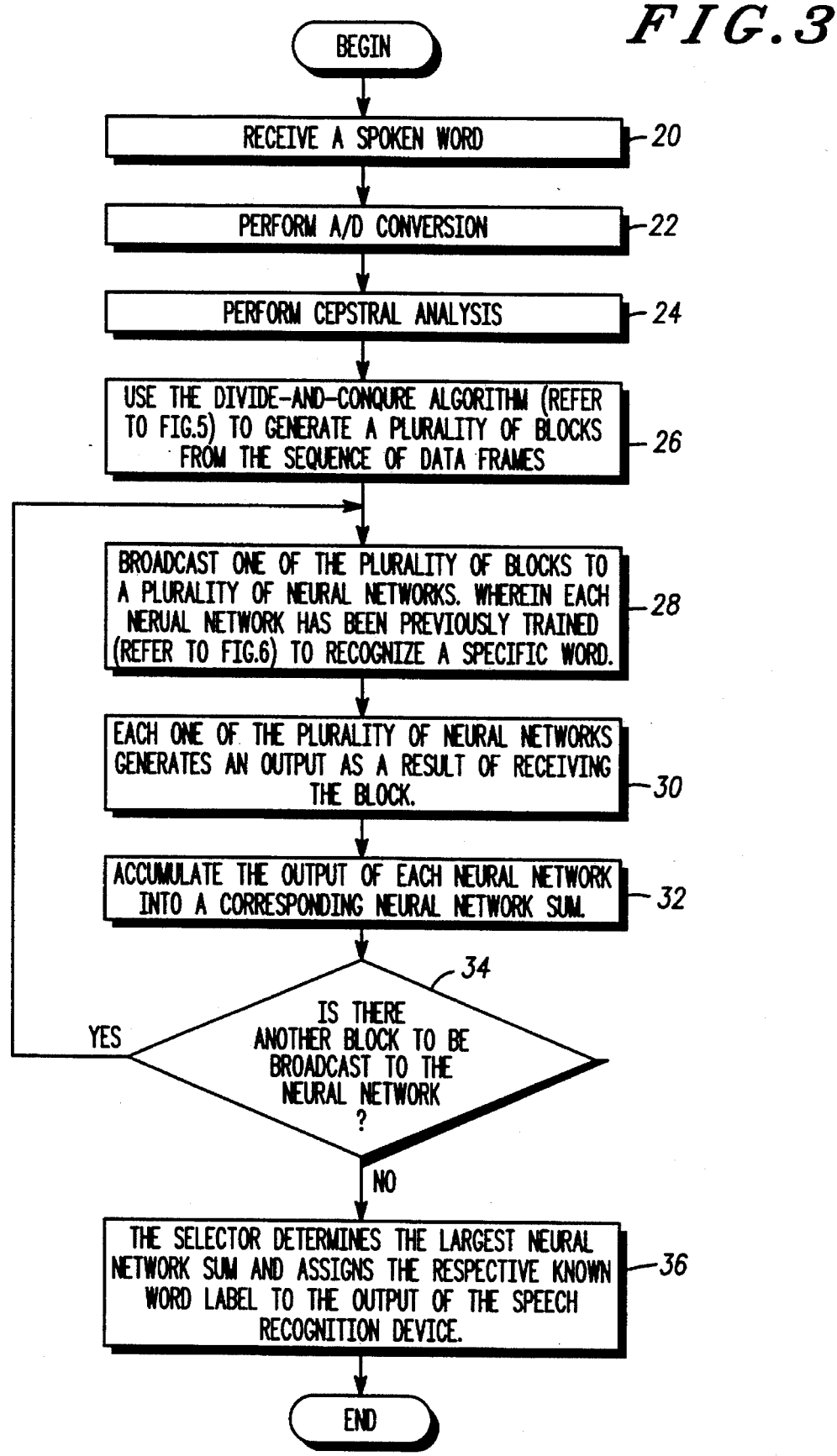
FIG. 3 shows a flow diagram of a method of operating the speech-recognition system illustrated in FIG. 2.

FIG. 3 shows a flow of a method of operating the speech-recognition system illustrated in FIG. 2. In box 20, a spoken word is received from the user by microphone 1 and converted to an electrical signal.

In box 22, A/D conversion is performed on the speech signal. In a preferred embodiment, A/D conversion is performed by pre-processing circuitry 9 of FIG. 2.

Next, in box 24, cepstral analysis is performed on the digitized signal resulting from the A/D conversion. The cepstral analysis is, in a preferred embodiment, also performed by pre-processing circuitry 9 of FIG. 2. The cepstral analysis produces a sequence of data frames which contain the relevant features of the spoken word.

In box 26, a divide-and-conquer algorithm, the steps of which are shown in FIG. 5, is used to generate a plurality of data blocks from the sequence of data frames. The divide-and-conquer algorithm is a method of partitioning the sequence of frames into a set of smaller, more manageable data blocks.

In box 28, one of the data blocks is broadcast to the neural networks. Upon exiting box 28, the procedure continues to box 30.

Figure 6:
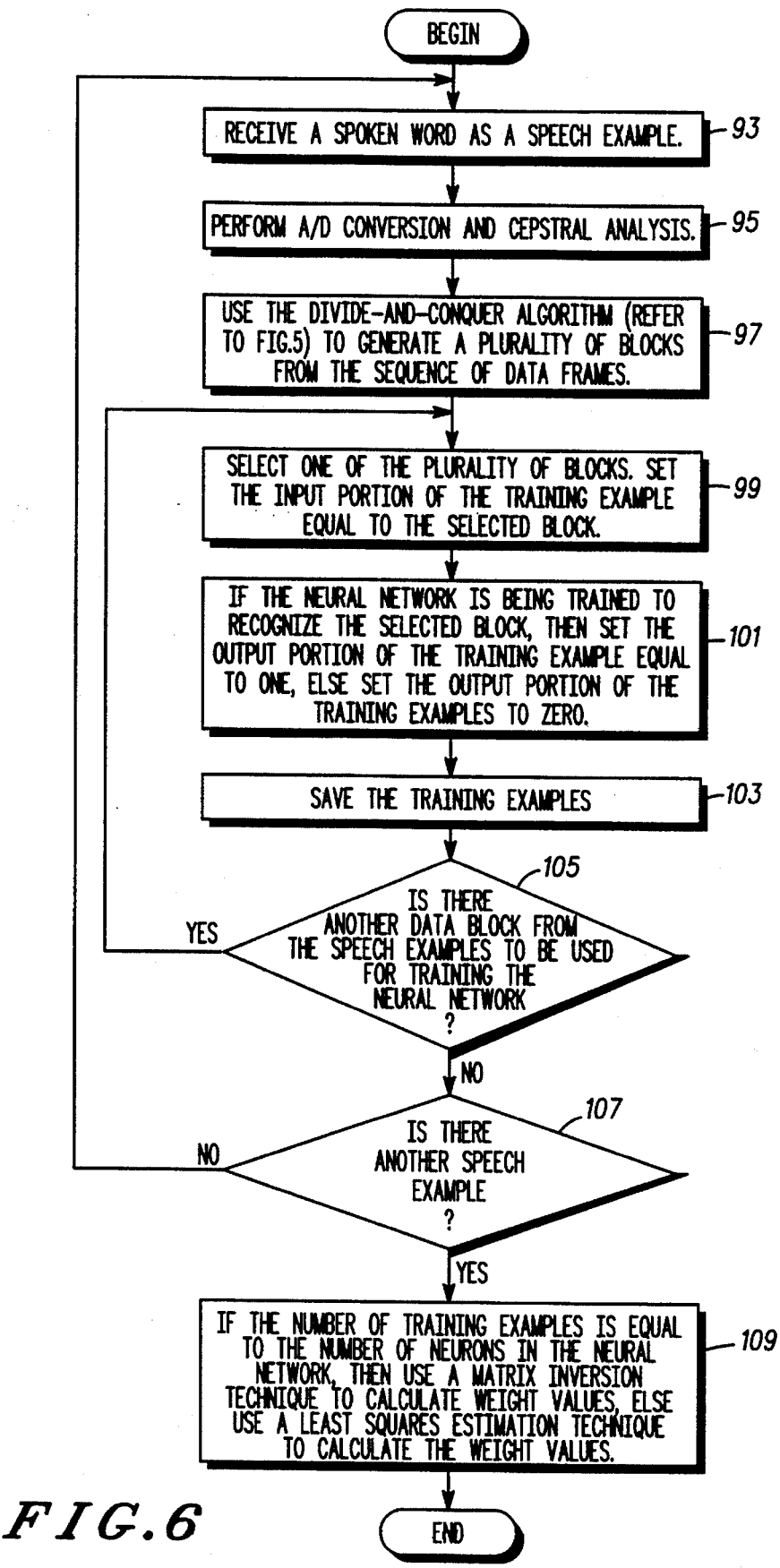
FIG. 6 shows a flow diagram of a method of training a neural network to recognize speech in accordance with a preferred embodiment of the present invention.

In box 30, each of the neural networks uses the data block in computing a discriminant function which is based on a polynomial expansion. A different discriminant function is computed by each neural network and generated as an output. The discriminant function computed by a neural network is determined prior to operating the speech-recognition system by using the method of training the neural network as shown in FIG. 6.

In box 32, the output of each neural network is added to a sum, wherein there is one sum generated for each neural network. This step generates a plurality of neural network sums, wherein each sum corresponds to a neural network.

In decision box 34, a check is made to determine whether there is another data block to be broadcast to the neural networks. If so, the procedure returns to box 28. If not, the procedure proceeds to box 36.

Next, in box 36, the selector determines which neural network sum is the largest, and assigns the known word label which corresponds to the sum as the output of the speech-recognition system.

Divide-and-Conquer Algorithm

FIG. 4 illustrates data inputs and outputs of a divide-and-conquer algorithm of the present invention. The divide-and-conquer algorithm is a method of partitioning the sequence of data frames into a set of smaller data blocks. The input to the algorithm is the sequence of data frames 38, which, in the example illustrated, comprises data frames 51–70. The sequence of data frames 38 contains data which represents the relevant features of a speech sample.

In a preferred embodiment, each data frame contains twelve data points, wherein each of the data points represents the value of a cepstrum coefficient or a function which is based on a cepstrum coefficient.

The data points are 32-bit digital words. Each data frame corresponds to a discrete time interval from the period during which the speech sample was spoken.

Those skilled in the art will understand that the present invention places no limits on the number of data points per frame or the bit length of the data points; the number of data points contained in a data frame may be twelve or any other value, while the data point bit length may be 32 bits, 16 bits, or any other value.

Additionally, the data points may be used to represent data other than values from a cepstrally-smoothed spectral envelope. For example, in various applications, each data point may represent a spectral amplitude at a specific frequency.

The divide-and-conquer algorithm 11 receives each frame of the speech sample sequentially and assigns the frame to one of several data blocks. Each data block comprises a subset of data frames from the input sequence of frames. Data blocks 42, 44, 46, and 48 are output by the divide-and-conquer algorithm 11. Although FIG. 4 shows the algorithm generating only four data blocks, the divide-and-conquer algorithm 11 is not limited to generating only four data blocks and may be used to generate either more or less than four blocks.

FIG. 5 shows a flow diagram of a method of executing a divide-and-conquer algorithm of the present invention. The divide-and-conquer algorithm partitions a sequence of data frames into a set of data blocks according to the following steps.

As illustrated in box 75, the number of data blocks to be generated by the algorithm is first calculated. The number of data blocks to be generated is calculated in the following manner. First, the number of frames per data block and the number of frames in the sequence are received. Both the number of blocks and the number of frames are integers. Second, the number of frames is divided by the number of frames per block. Next, the result of the division operation is rounded up to the nearest integer, resulting in the number of data blocks to be generated by the divide-and-conquer algorithm. Upon exiting box 75, the procedure continues in box 77.

In box 77 the first frame of the sequence of frames is equated to a variable called the current frame. It will be apparent to one of ordinary skill that the current frame could be represented by either a software variable or, in hardware, as a register or memory device.

Next in box 79, a current block variable is equated to the first block. In software the current block may be a software variable which represents a data block. In a hardware implementation the current block may be one or more registers or memory devices. After the current block is equated to the first block, the current frame is assigned to the current block. The procedure then proceeds to decision box 81.

Next, as illustrated by decision box 81, a check is made to determine whether or not there are more frames from the sequence of frames to be processed. If so, the procedure continues to box 83. If not, the procedure jumps to box 91.

In box 83, the next frame from the sequence of frames is received and equated to the current frame variable.

In box 85, the current block variable is equated to the next block, and then the current frame variable is assigned to the current block variable. Upon exiting box 85, the procedure proceeds to decision box 87.

As illustrated in decision box 87, if the current block variable is equal to the last block, then the procedure continues to box 89, otherwise the procedure returns to box 81.

In box 89, the next block is set equal to the first block, and upon exiting box 89 the procedure returns to decision box 81.

Box 91 is entered from decision box 81. In box 91, a check is made to determine if the current block variable is equal to the last block. If so, the procedure terminates. If not, the current frame is assigned to each of the remaining data blocks which follow the current block, up to and including the last block, as previously explained above in the description of FIG. 2.

Training Algorithm

The speech-recognition system of the present invention has principally two modes of operation: (1) a training mode in which examples of spoken words are used to train the neural networks, and (2) a recognition mode in which unknown spoken words are identified. Referring to FIG. 2, generally, the user must train neural networks 12, 13, and 14 by speaking into microphone 1 all of the words that the system is to recognize. In some cases the training may be limited to several users speaking each word once. However, those skilled in the art will realize that the training may require any number of different speakers uttering each word more than once.

For a neural network to be useful, the weights of each neuron circuit must be determined. This can be accomplished by the use of an appropriate training algorithm.

In implementing a neural network of the present invention, one generally selects the number of neurons or neuron circuits to be equal to or less than the number of training examples presented to the network.

A training example is defined as one set of given inputs and resulting output(s). In a preferred embodiment of the present invention, each word spoken into microphone 1 of FIG. 2 generates at least one training example.

For a preferred embodiment of the present invention, the training algorithm used for the neural networks is shown in FIG. 6.

FIG. 6 shows a flow diagram of a method of training a neural network to recognize speech in accordance with a preferred embodiment of the present invention. First, regarding box 93, an example of a known word is spoken into a microphone of the speech-recognition system.

In box 95, A/D conversion is performed on the speech signal. Cepstral analysis is performed on the digitized signal which is output from the A/D conversion. The cepstral analysis produces a sequence of data frames which contain the relevant features of the spoken word. Each data frame comprises twelve 32-bit words which represent the results of the cepstral analysis of a time slice of the spoken word. In a preferred embodiment, the duration of the time slice is 15 milliseconds.

Those skilled in the art will understand that the present invention places no limit on the bit length of the words in the data frames; the bit length may be 32 bits, 16 bits, or any other value. In addition, the number of words per data frame and the duration of the time slice may vary, depending on the intended application of the present invention.

Next, in box 97, a divide-and-conquer algorithm (the steps of which are shown in FIG. 5) is used to generate a plurality of blocks from the sequence of data frames.

In box 99, one of the blocks generated by the divide-and-conquer algorithm is selected. The input portion of a training example is set equal to the select block.

In box 101, if the neural network is being trained to recognize the selected block, then the output portion of the block is set to one, otherwise it is set to zero. Upon exiting box 101 the procedure continues with box 103.

Next, in box 103, the training example is saved in memory of computer 5 (FIGS. 1 and 2). This allows a plurality of training examples to be generated and stored.

In decision box 105, a check is made to determine if there is another data block, generated from the current sequence of data frames, to be used in training the neural network. If so, the procedure returns to box 99. If not, the procedure proceeds to decision box 107.

In decision box 107, a determination is made to see if there is another spoken word to be used in the training session. If so, the procedure returns to box 93. If not, the procedure continues to box 109.

In box 109, a comparison is made between the number of training examples provided and the number of neurons in the neural network. If the number of neurons is equal to the number of training examples, a matrix-inversion technique may be employed to solve for the value of each weight. If the number of neurons is not equal to the number of training examples, a least-squares estimation technique is employed to solve for the value of each weight. Suitable least-squares estimation techniques include, for example, least-squares, extended least-squares, pseudo-inverse, Kalman filter, maximum-likelihood algorithm, Bayesian estimation, and the like.

SUMMARY

There has been described herein a concept, as well as several embodiments including a preferred embodiment, of a method of training neural networks utilized in speech recognition.

Because the various embodiments of the speech-recognition system as herein described utilize a divide-and-conquer algorithm to partition speech samples, and a suitable method for training neural networks which operate upon the outputs generated by the divide-and-conquer algorithm, such embodiments are insensitive to differences in speakers and not adversely affected by background noise.

It will also be appreciated that the various embodiments of the speech-recognition system as described herein include a neural network which does not require repetitive training and which yields a global minimum to each given set of input vectors; thus, the embodiments of the present invention require substantially less training time and are significantly more accurate than known speech-recognition systems.

Furthermore, it will be apparent to those skilled in the art that the disclosed invention may be modified in numerous ways and may assume many embodiments other than the preferred form specifically set out and described above.

It will be understood that the concept of the present invention can vary in many ways. Accordingly, it is intended by the appended claims to cover all modifications of the invention which fall within the true spirit and scope of the invention.

What is claimed is:

1. A method of training a neural network used in a speech-recognition system, said neural network comprising a plurality of neurons, said method comprising the following steps:

receiving an example spoken word;

performing analog-to-digital conversion of said example spoken word to produce a digitized signal;

performing cepstral analysis of said digitized signal to produce a sequence of data frames;

generating a plurality of data blocks from said sequence of data frames;

determining if said neural network is to recognize said example spoken word;

(i) if so, equating neural network output to one;

(ii) if not, equating said neural network output to zero; and training said neural network by calculating a plurality of weight values for said neural network, wherein if the number of said neurons is equal to the number of said data blocks, a matrix-inversion technique is used to calculate said weight values, otherwise, a least-squares estimation technique is used to calculate said weight values.

2. The method recited in claim 1, wherein the step of generating includes the following sub-steps:

(a) equating a current frame to a first one of said sequence of frames;

(b) equating a current data block to a first data block, said plurality of data blocks including said first data block and a last data block;

(c) assigning said current frame to said current data block;

(d) determining whether there is a next frame in said sequence of frames;
  (i) if so, proceeding to step (e);
  (ii) if not, proceeding to step (k);

(e) equating said current frame to said next frame;

(f) equating said current data block to a next data block;

(g) assigning said current frame to said current data block;

(h) determining if said current data block equals said last data block;
  (i) if so, proceeding to step (j);
  (ii) if not, returning to step (d);

(j) equating said next data block to said first data block, and returning to step (d); and (k) determining if said current data block equals said last data block;
  (i) if not, assigning said current frame to remaining ones of said plurality of data blocks.

3. The method recited in claim 1, wherein said plurality of data blocks includes a first data block and a last data block and the step of generating includes the following sub-steps:

(a) determining the number of data frames in said sequence of data frames;

(b) defining the number of data frames per data block;

(c) based on the number of data frames per block, calculating the number of data blocks to be generated;

(d) equating a current frame to a first one of said sequence of data frames;

(e) equating a current data block to said first data block;

(f) assigning said current frame to said current data block;

(g) determining whether there is a next frame in said sequence of frames;
  (i) if so, proceeding to step (h);
  (ii) if not, proceeding to step (n);

(h) equating said current frame to said next frame;

(j) equating said current data block to a next data block of said plurality of data blocks;

(k) assigning said current frame to said current data block;

(l) determining if said current data block is said last data block;
  (i) if so, proceeding to step (m);
  (ii) if not, returning to step (g);

(m) equating said next data block to said first data block, and returning to step (g); and (n) determining if said current data block is said last data block;
  (i) if not, assigning said current frame to remaining ones of said plurality of data blocks.

4. The method recited in claim 3, wherein step (c) includes the following sub-steps:

dividing said number of frames by said frames per data block to produce a result; and rounding up said result to a nearest integer to generate the number of data blocks to be generated.

5. The method recited in claim 1, wherein each frame in said sequence of frames comprises a plurality of data points, wherein each of said data points represents the amplitude of cepstrally-smoothed spectrum at a specific frequency.

6. The method recited in claim 1, wherein said neural network computes a discriminant function based upon a polynomial expansion.

7. The method recited in claim 6, wherein said polynomial expansion has the form:

$$y = \sum_{i=1}^{m} w_{i-1} x_1^{g_{1i}} x_2^{g_{2i}} \ldots x_n^{g_{ni}}$$

wherein y represents the output of the neural network;

wherein $w_{i-1}$ represents the weight value for the ith neuron;

wherein $x_1, x_2, \ldots, x_n$ represent inputs to said neural network;

wherein $g_{1i}, \ldots, g_{ni}$ represent gating functions for the ith neuron which are applied to said inputs; and wherein m and n are positive integers.

8. The method recited in claim 6, wherein said polynomial expansion has the form:

$$y = w_0 + \sum_{i=1}^{n} w_i x_i + \sum_{i=1}^{n} w_{f1(i)} x_i^2 + \\ \sum_{i=1}^{n} \sum_{j=i+1}^{n} w_{f2(i,j)} x_i x_j + \sum_{i=1}^{n} w_{f3(i)} x_i^3 + \\ \sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 + \\ \sum_{i=1}^{n} \sum_{j=i+1}^{n} \sum_{k=i+j+1}^{n} w_{f6(i,j,k)} x_i x_j x_k + \ldots$$

wherein y represents the output of the neural network;

wherein $w_{i-1}$ represents the weight value for the ith neuron;

wherein $x_i, x_j, x_k$ represent inputs to said neural network;

wherein n is a positive integer; and wherein $f_{1(i)}$ through $f6_{(i,j,k)}$ are index-generating functions.

9. The method recited in claim 6, wherein said polynomial expansion has the form:

$$y = w_0 + w_1 x_1 + w_2 x_2 + \ldots w_i x_i + \ldots + w_n x_n + \\
w_{n+1} x_1^2 + \ldots + w_{2n} x_n^2 + w_{2n+1} x_1 x_2 + \\
w_{2n+2} x_1 x_3 + \ldots + w_{3n-1} x_1 x_n + w_{3n} x_2 x_3 + \\
w_{3n+1} x_2 x_4 + \ldots w_{2n+(n)(n-1)/2} x_{n-1} x_n + \ldots + \\
w_{N-1} x_1^{g_{1N}} x_2^{g_{2N}} \ldots x_n^{g_{nN}} + \ldots$$

wherein y represents the output of the neural network;

wherein $w_0, w_1, \ldots, w_{N-1}$ represent weight values, N being a positive integer representing the Nth neuron, and the term $w_i$ in general representing the weight value associated with the i+1 neuron;

wherein $x_1, x_2, \ldots, x_n$ represent inputs to said neural network, n being a positive integer; and wherein $g_{1N}, \ldots, g_{nN}$ represent gating functions for the Nth neuron which are applied to said inputs.

10. The method recited in claim 1, wherein said neural network computes a discriminant function based upon an orthogonal function.

11. The method recited in claim 10, wherein said orthogonal function is a sine, cosine, exponential, logarithmic, Fourier transformation, Legendre polynomial, or a non-linear function such as a Volterra function or a radial basis function.

12. The method recited in claim 1, wherein said neural network computes a discriminant function based upon a combination of polynomial expansion and orthogonal functions.

13. The method recited in claim 1, wherein every training example is used only once by said method.

14. The method recited in claim 1, wherein said neural networks are contained on at least one integrated circuit.

15. The method recited in claim 1, wherein said neural networks are contained in a computer program.

16. The method recited in claim 1, wherein said least-squares estimation technique utilizes a least-squares error technique.

17. The method recited in claim 1, wherein said least-squares estimation technique utilizes an extended least-squares technique.

18. The method recited in claim 1, wherein said least-squares estimation technique utilizes a Kalman filter.

19. The method recited in claim 1, wherein said least-squares estimation technique utilizes a maximum-likelihood algorithm.

20. The method recited in claim 1, wherein said least-squares estimation technique utilizes a pseudo-inverse algorithm.

21. The method recited in claim 1, wherein said least-squares estimation technique utilizes a Bayesian estimation.

* * * * *